United States Patent [19]

Eldin et al.

[11] Patent Number: 4,906,722

[45] Date of Patent: Mar. 6, 1990

[54] THERMOSETTING REACTIVE SYSTEMS

[75] Inventors: Sameer H. Eldin, Fribourg; Alfred Renner, Muntelier, both of Switzerland

[73] Assignee: Ciba-Geigy Corporation, Ardsley, N.Y.

[21] Appl. No.: 273,774

[22] Filed: Nov. 21, 1988

[30] Foreign Application Priority Data

Dec. 2, 1987 [CH] Switzerland .................... 4707/86

[51] Int. Cl.$^4$ .............................................. C08G 18/58
[52] U.S. Cl. ..................................... 528/49; 524/729; 524/786; 524/871; 524/872; 524/873; 524/874; 528/52; 528/53; 528/59; 528/68; 528/73
[58] Field of Search ..................... 528/49, 52, 53, 73, 528/68, 59; 524/729, 786, 871, 872, 873, 874

[56] References Cited

U.S. PATENT DOCUMENTS

| | | | |
|---|---|---|---|
| 4,202,920 | 5/1980 | Renner et al. | 427/386 |
| 4,564,651 | 1/1986 | Markert et al. | 524/589 |
| 4,582,723 | 4/1986 | Markert et al. | 528/73 |
| 4,631,306 | 12/1986 | Markert et al. | 523/457 |

*Primary Examiner*—Maurice J. Welsh
*Assistant Examiner*—Rabon A. Sergent
*Attorney, Agent, or Firm*—Luther A. R. Hall

[57] ABSTRACT

Thermosetting reactive systems, comprising
(a) at least one epoxide resin,
(b) at least one isocyanate resin,
(c) a reaction accelerator of the formula I $$N\equiv C-CH_2-\overset{O}{\underset{\|}{C}}-NH-R^1-N\overset{R^2}{\underset{R^3}{\diagdown}}$$  I in which $R^1$ is $-(CR^4R^5)_n-$ with $n=2-24$, phenylene or naphthylene which is unsubstituted or mono- or poly-substituted by halogen, nitro, $C_1-C_4$-alkyl, $C_1-C_4$alkoxy or $C_3-C_8$dialkylaminoalkyl, or a radical of the formulae $$-CH_2-\!\!\underset{}{\bigcirc}\!\!-CH_2-\ ,$$

$$-CH_2-\!\!\underset{CH_3}{\bigcirc}\!\!-CH_2-\ \text{or}$$

$$-CH_2-\!\!\underset{CH_3}{\overset{CH_3}{\bigcirc}}\!\!-CH_2-,$$

$R^2$ and $R^3$ independently of one another are $C_1-C_{12}$alkyl, phenyl or naphthyl which are unsubstituted or mono- or poly-substituted by halogen, nitro, $C_1-C_4$alkyl or $C_1-C_1-C_4$alkoxy, or also $C_7-C_{13}$aralkyl, or in which $R^2$ and $R^3$, together with the N atom to which they are linked, form a 5-membered, 6-membered or 7-membered heterocyclic ring, and $R^4$ and $R^5$ independently of one another are hydrogen or $C_1-C_8$alkyl, and
(d) if appropriate, a filler and/or further additives conventional in industry, have a long pot life and excellent heat-aging resistance.

18 Claims, No Drawings

THERMOSETTING REACTIVE SYSTEMS

The present invention relates to thermosetting reactive resin mixtures comprising polyepoxides, polyisocyanates, a cyanoacetamide compound as a reaction accelerator and, if appropriate, fillers and/or conventional additives, and to the use of cyanoacetyl compounds as a hardener for such reactive mixtures.

German Offenlegungsschrift 3,323,084 has disclosed the use of tertiary amines and imidazoles as well as onium salts of tertiary amines and imidazoles, addition complexes of boron trihalides with tertiary amines and imidazoles, or tertiary amines and imidazoles deactivated by electron acceptors as reaction accelerators for reactive resin mixtures of polyepoxides and polyisocyanates (EP/IC resins) in an EP:IC molar mixing ratio from 1 to 5.

As hardeners for such EP/IC resins, the $BF_3$ complexes and $BCl_3$ complexes of n-octyldimethylamine and of benzyldimethylamine and also 7,7,8,8-tetracyanoquinodimethane-1-cyanoethyl-2-phenyl-imidazole are specifically listed in EP-A 130,454 as representatives of a deactivated imidazole accelerator.

Moreover, amines, especially tertiary amines and imidazoles, are described in German Offenlegungsschrift 3,323,153 as particularly suitable reaction accelerators for special EP/IC resins which, for an improvement in the thermal/mechanical properties of the resins, contain polyoxyalkylene glycol polyglycidyl ethers as an additional epoxide resin component.

In addition, cyanoacetates and cyanoacetamides are known from German Offenlegungsschrift 2,846,123 as hardeners for epoxide resins under the action of heat.

It is, however, a disadvantage that the reactive resin systems, which contain boron halide/amine complexes as reaction accelerators, have poor moisture resistance. For example, for a combination of 3-4% of $BF_3$/monoethylamine with an epoxide resin, this leads to a very pronounced rise in the dielectric loss factor at 96% relative humidity at 70° C. In addition, highly corrosive gases such as HCl and HF can be formed by hydrolysis of the corresponding boron halides, which is a disadvantage for use in the field of electrical engineering and electronics.

In addition, there is a demand for EP/IC resin systems with reaction accelerators which, at the processing temperature, show a slowly proceeding reaction, i.e. allow a longer processing time and also show better storage stability. Good heat-aging resistance is also important for the use of such EP/IC resin systems in the field of electrical engineering and electronics.

Surprisingly, cyanoacetamide accelerators in fact have the desired properties, outlined above, in reactive EP/IC resin systems.

The present invention relates to thermosetting reactive systems comprising
(a) at least one epoxide resin,
(b) at least one isocyanate resin,
(c) a reaction accelerator of the formula I

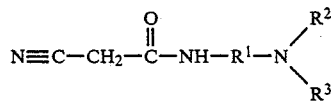

in which $R^1$ is $-(CR^4R^5)_n-$ with n=2-24, phenylene or naphthylene which are unsubstituted or mono- or poly-substituted by halogen, nitro, $C_1-C_4$-alkyl, $C_1-C_4$alkoxy or $C_3-C_8$dialkylaminoalkyl, or a radical of the formulae

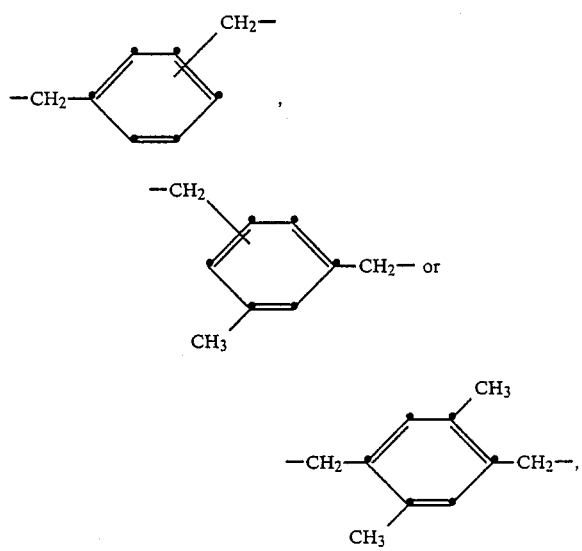

$R^2$ and $R^3$ independently of one another are $C_1-C_{12}$alkyl, phenyl or naphthyl which are unsubstituted or mono- or poly-substituted by halogen, nitro, $C_1-C_4$alkyl or $C_1-C_4$alkoxy, or also $C_7-C_{13}$aralkyl, or in which $R^2$ and $R^3$, together with the N atom to which they are linked, form a 5-membered, 6-membered or 7-membered heterocyclic ring, and $R^4$ and $R^5$ independently of one another are hydrogen or $C_1-C_8$alkyl, and (d) if appropriate, a filler and/or further additives conventional in industry.

Preferably, the reactive systems according to the invention contain, as the epoxide resins a) polyepoxide compounds, especially those containing aliphatic, cycloaliphatic or aromatic epoxides or mixtures thereof.

Suitable epoxides resins (a) are all types of epoxide resins, for example those which contain groups, bonded directly to oxygen, nitrogen or sulfur atoms, of the formula II

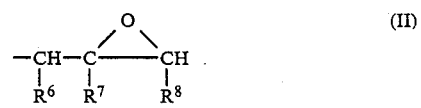

in which either $R^6$ and $R^8$ are each a hydrogen atom, in which case $R^7$ is then a hydrogen atom or a methyl group, or $R^6$ and $R^8$ together are $-CH_2CH_2-$ or $-CH_2CH_2CH_2-$, in which case $R^7$ is then a hydrogen atom.

Examples of such resins are polyglycidyl esters and poly($\beta$-methylglycidyl) esters which an be obtained by reacting a compound, containing two or more carboxyl groups per molecule, with epichlorohydrin, glycerol dichlorohydrin or $\beta$-methylepichlorohydrin in the presence of alkali. Such polyglycidyl esters can be derived from aliphatic polycarboxylic acids, for example oxalic acid, succinic acid, glutaric acid, adipic acid, pimelic acid, suberic acid, azelaic acid, sebacic acid or dimerized or trimerized linoleic acid, from cycloaliphatic polycarboxylic acids such as tetrahydrophthalic acid, 4-methyltetrahydrophthalic acid, hexahydrophthalic acid and 4-methylhexahydrophthalic acid, and from aromatic polycarboxylic acids such as phthalic acid, isophthalic acid and terephthalic acid.

Further examples are polyglycidyl and poly-(β-methylglycidyl)-ethers which can be obtained by reacting a compound, containing at least two free alcoholic and/or phenolic hydroxyl groups per molecule, with the corresponding epichlorohydrin under alkaline conditions, or also in the presence of an acid catalyst with subsequent alkali treatment. These ethers can be prepared with poly-(epichlorohydrin) from acyclic alcohols, such as ethylene glycol, diethylene glycol and higher poly-(oxyethylene) glycols, propane-1,2-diol and poly-(oxypropylene) glycols, propane-1,3-diol, butane-1,4-diol, poly-(oxytetramethylene) glycols, pentane-1,5-diol, hexane-1,6-diol, hexane-2,4,6-triol, glycerol, 1,1,1-trimethylolpropane, pentaerythritol and sorbitol, from cycloaliphatic alcohols such as resorcinol, quinitol, bis-(4-hydroxycyclohexyl)-methane, 2,2-bis-(4-hydroxycyclohexyl)-propane and 1,1-bis-(hydroxymethyl)-cyclohex-3-ene, and from alcohols with aromatic nuclei, such as N,N-bis-(2-hydroxyethyl)-aniline and p,p'-bis-(2-hydroxyethylamino)-diphenylmethane. They can also be prepared from mononuclear phenols such as resorcinol and hydroquinone and polynuclear phenols such as bis-(4-hydroxyphenyl)-methane, 4,4-dihydroxybiphenyl, bis-(4-hydroxyphenyl) sulfone, 1,1,2,2-tetrakis-(4-hydroxyphenyl)-ethane, 2,2-bis-(4-hydroxyphenyl)-propane (otherwise known as bisphenol A) and 2,2-bis-(3,5-dibromo-4-hydroxyphenyl)-propane, and from novolaks formed from aldehydes, such as formaldehyde, acetaldehyde, chloral and furfural, with phenols such as phenol itself and a phenol ring-substituted by chlorine atoms or alkyl groups each having up to nine carbon atoms, such as 4-chlorophenol, 2-methylphenol and 4-tertbutylphenol.

Poly-(N-glycidyl) compounds comprise, for example, those which are obtained by dehydrochlorination of the reaction products of epichlorohydrin with amines containing at least two amino hydrogen atoms, such as aniline, n-butylamine, bis-(4-aminophenyl)-methane and bis-(4-methylaminophenyl)-methane, triglycidyl isocyanurate and also N,N'-diglycidyl derivatives of cyclic alkyleneureas such as ethyleneurea and 1,3-propyleneurea, and hydantoins such as 5,5-dimethylhydantoin.

Examples of poly-(S-glycidyl) compounds are the di-S-glycidyl derivatives of dithiols such as ethane-1,2-dithiol and bis-(4-mercaptomethylphenyl) ether.

Examples of epoxide resins with groups of the formula II, in which $R^6$ and $R^8$ together are a -CH$_2$CH$_2$- group, are bis-(2,3-epoxycyclopentyl) ether, 2,3-epoxycyclopentyl glycidyl ether, 1,2-bis-(2,3-epoxycyclopentyloxy)-ethane and 3,4-epoxycyclohexylmethyl 3',4'-epoxycyclohexanecarboxylate.

Those epoxide resins are also suitable in which the 1,2-epoxide groups are bonded to heteroatoms of different type, for example the N,N,O-triglycidyl derivative of 4-aminophenol, the glycidyl ether/glycidyl ester of salicylic acid or p-hydroxybenzoic acid, N-glycidyl-N'-(2-glycidyloxypropyl)-5,5-dimethylhydantoin and 2-glycidyloxy-1,3-bis-(5,5-dimethyl-1-glycidyl-hydantoin-3-yl)-propane.

Novolak epoxide resins and polyoxyalkylene glycol polyglycidyl ethers are particularly preferred.

As the isocyanate resins (b) the reactive systems according to the invention preferably contain polyisocyanate compounds, in particular those containing aliphatic, cycloaliphatic or aromatic isocyanates or mixtures thereof.

Preferably, isomer mixtures of 4,4'- and 2,4'-diphenylmethane diisocyanate, polyol-modified polyisocyanates and mixtures of liquid polyisocyanates with higher-molecular polyisocyanates or carbodiimide-polyisocyanates are used.

Examples of further polyisocyanates which can be used are hexane 1,6-diisocyanate, cyclohexane 1,3-diisocyanate and isomers, 4,4'-dicyclohexylmethane diisocyanate, 3-isocyanatomethyl-3,5,5-trimethylcyclohexyl isocyanate, 1,3-dimethylbenzene ω,ω'-diisocyanate and isomers, 1-methylbenzene 2,4-diisocyanate and isomers, naphthalene 1,4-diisocyanate, diphenyl ether 4,4'-diisocyanate and isomers, diphenyl sulfone 4,4'-diisocyanate and isomers, and also trifunctional or more highly functional isocyanates such as 3,3',4,4'-diphenylmethane tetraisocyanate. It is also possible to use isocyanates which are masked with phenol or cresol in the usual manner. Dimers and trimers of the polyvalent isocyanates mentioned can also be used. Such polyisocyanates have terminal free isocyanate groups and contain one or more uretdione and/or isocyanurate rings. Processes for preparing various types of such trimers and uretdiones are described, for example, in U.S. Pat. Nos. 3,494,888, 3,108,100 and 2,977,370.

In the reaction accelerators (c) according to the invention $R^1$ can, if $R^1$ is -(CH$_2$)$_n$- with $n=2-24$, be for example ethylene, propylene, tetramethylene, octamethylene, decamethylene, heptadecylmethylene, eicosamethylene or tetracosamethylene.

Moreover, halogen-substituted phenylene or naphthylene $R^1$ is monosubstituted or polysubstituted, in particular polysubstituted, phenylene or naphthylene, substitution being possible in any position. The halogen substituents are preferably chlorine and bromine.

Nitro-substituted phenylen or naphthylene $R^1$ can be monosubstituted or polysubstituted, in particular monosubstituted, and substitution is possible in any position.

$C_1$–$C_4$Alkyl-substituted phenylene or naphthylene $R^1$ can be monosubstituted or polysubstituted, preferably monosubstituted, and substitution is possible in any position. Examples of $C_1$–$C_4$alkyl substituents are methyl, ethyl, n-propyl, isopropyl, n-butyl, isobutyl, sec-butyl or tert-butyl.

$C_1$–$C_4$Alkoxy-substituted phenylene or naphthylene $R^1$ can be monosubstituted or polysubstituted, in particular monosubstituted, and substitution is possible in any position. Examples of $C_1$–$C_4$alkoxy substituents are methoxy, ethoxy, n-propoxy, isopropoxy, n-butoxy, isobutoxy, sec-butoxy or tert-butoxy.

In $C_3$–$C_8$dialkylaminoalkyl-substituted phenylene or naphthylene $R^1$, $C_3$–$C_8$ defines the total C number. It can be monosubstituted or disubstituted, in particular disubstituted. Examples of such substituents are dimethylaminoethyl, diethylaminobutyl or dimethylaminomethyl.

$C_1$–$C_{12}$Alkyl $R^2$ and $R^3$ are straight-chain or branched alkyl radicals, for example methyl, ethyl, n-propyl, isopropyl, n-butyl, isobutyl, sec-butyl, tert-butyl or branched or straight-chain hexyl, octyl, nonyl or dodecyl. Halogen-substituted phenyl or naphthyl $R^2$ and $R^3$ are monosubstituted or polysubstituted, in particular polysubstituted, phenyl or naphthyl, substitution being possible in any position. The preferred halogen substituents are chlorine and bromine.

Nitro-substituted phenyl or naphthyl $R^2$ and $R^3$ can be monosubstituted or disubstituted, in particular disubstituted, substitution being possible in any position.

$C_1$–$C_4$Alkyl-substituted phenyl or naphthyl $R^2$ and $R^3$ can be monosubstituted or polysubstituted, preferably monosubstituted, substitution being possible in any position. Examples of possible alkyl substituents are methyl, ethyl, n-propyl or isobutyl. Examples are 2,4,6-trimethylphenyl, 2,5-dimethylphenyl, 3-isopropylphenyl, 4-methylphenyl, 3,4-diethylphenyl, 2-methylnaphthyl or 2,6-dimethylnaphthyl.

$C_1$–$C_4$Alkoxy-substituted phenyl or naphthyl $R^2$ and $R^3$ can be monosubstituted or poly-substituted, in particular monosubstituted, substitution being possible in any position. Examples of possible substituents are methoxy, ethoxy, n-propoxy, isopropoxy and n-butoxy.

Examples of phenyl or naphthyl radicals substituted in this way are 4-n-butoxyphenyl, 3,5-dimethoxyphenyl or 4-ethoxynaphthyl.

Examples of $C_7$–$C_{13}$aralkyl $R^2$ and $R^3$ are benzyl, 1- or 2-phenethyl, 3-phenylpropyl, α,α-dimethylbenzyl, 2-phenylisopropyl, 2-phenylhexyl or naphthylmethyl. Benzyl is preferred.

Examples of $R^2$ and $R^3$ forming, together with the N atom to which they are linked, a 5-membered, 6-membered or 7-membered heterocyclic ring are pyrrolidine, morpholine, piperazine, 4-methylpiperazine, piperidine or perhydroazepine radicals, but preferably morpholine, piperazine or piperidine radicals, especially the morpholine radical.

$C_1$–$C_8$Alkyl $R^4$ and $R^5$ are straight-chain or branched alkyl radicals, for example methyl, ethyl, n-propyl, isopropyl, n-butyl, isobutyl, sec-butyl, tert-butyl, straight-chain or branched pentyl, hexyl, heptyl or octyl.

However, straight-chain radicals $R^4$ and $R^5$ are preferred, especially methyl and ethyl.

Those compounds of the formula I are preferred in which $R^1$ is -$(CH_2)_n$- and n is a number from 2 to 20, especially 3 to 6.

Those compounds of the formula I are likewise of interest in which $R^2$ and $R^3$ independently of one another are $C_1$–$C_5$alkyl, especially methyl or ethyl.

Those compounds of formula I are of particular interest in which $R^2$ and $R^3$ are identical.

Those compounds of the formula I are especially preferred in which $R^1$ is ethylene or propylene, and $R^2$ and $R^3$ are identical and are methyl, ethyl, propyl or butyl.

The EP/IC resins can also contain components which in general do not participate in the chemical reactions which lead to the hardened mouldings. Suitable fillers of this type are mineral and fibrous fillers, such as powdered silica, fused silica, alumina, glass powder, mica, kaolin, dolomite, graphite, carbon black as well as carbon fibres and textile fibres. Preferred fillers are powdered silica, fused silica, alumina or dolomite. Colorants, stabilizers and adhesion promoters as well as other additives of conventional type can also be added to the EP/IC resins.

The reactive EP/IC resin systems, which can be hardened by the reaction accelerators of the formula I according to the invention, have preferably a molar mixing ratio of the epoxide and isocyanate groups (EP:IC) of 0.1 to 5.0 An EP:IC ratio of 0.3 to 2.5, but in particular a ratio of 0.4 to 1.0, is particularly preferred.

These reactive thermosetting EP/IC resin systems are used as unfilled or filled resins systems, especially as casting resins and impregnating resins for electrical engineering (for example, manufacture of pin-type insulators).

Casting resin processing in enclosed systems (pressure gelling process) is particularly preferred. In this case, the resin system is crosslinked under pressure at gelling temperatures from 130° to 150° C. and fully hardened at temperatures from 150° to 250° C.

Processing in a manner analogous to injection-moulding is also possible.

The reaction accelerators of the formula I are added to these EP/IC reactive resin systems for hardening, advantageously in quantities from 0.01–5.0% by weight, preferably 0.1 to 2.5% by weight, especially 0.1 to 1.5% by weight, relative to the unfilled casting resin composition.

The reaction accelerators of the formula I according to the invention can be prepared, for example, in the manner described in German Offenlegungsschrift 2,846,123.

Examples of reaction accelerators are listed in Table 1 which follows.

TABLE 1

| Example | Reaction accelerator | Boiling point [°C.] | Viscosity in Pa.s | $n_D^\alpha$ |
|---|---|---|---|---|
| 1 | NC—CH$_2$—C(=O)—NH—(CH$_2$)$_3$—N(CH$_3$)$_2$ | 105–107/ 0.13 mbar | 140 | 1.4762 |
| 2 | NC—CH$_2$—C(=O)—NH—(CH$_2$)$_2$—N(CH$_3$)$_2$ | 147/ 1.3 mbar | | |
| 3 | NC—CH$_2$—C(=O)—NH—(CH$_2$)$_3$—N(C$_2$H$_5$)$_2$ | 134° C./ 0.52 mbar | 125 | 1.4801 |

TABLE 1-continued

| Example | Reaction accelerator | Boiling point [°C.] | Viscosity in Pa.s | $n_D^\alpha$ |
|---|---|---|---|---|
| 4 | 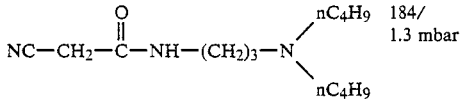 | 184/ 1.3 mbar | | |

EXAMPLE 5

The following base formulation is used as the reactive resin system, the quantitative data being given in parts by weight or percent by weight, unless otherwise stated.

Novolak epoxide resin (5.7 equivalents/kg) 100
Polypropylene glycol diglycide (2.55 equivalents/kg) 100
p,p-Diisocyanatodiphenylmethane (7.8 equivalents/kg) 250
Reaction accelerator 1/30 mol/epoxide from Example 1 4.2
Powdered silica W 12 (for filled resin systems) 836

(A) Heat aging

The components novolak/epoxide resin, polypropylene glycol diglycide and p,p-diisocyanatodiphenylmethane are weighed into a metal container. The mixture is heated to 100° C., whereupon the reaction accelerator and one drop of Glassomax ® 580-1501 (Glasorit Werke, Hamburg) is added as an antifoam.

The reaction mixture is stirred for 2 to 3 minutes by means of a mechanical stirring device (motor with blade stirrer) and then degassed for about 5 minutes (pump performance about 500 l/minute, about 0.1 mbar) and poured at about 80° C. into a 3 mm mould preheated to 100° C. and fully hardened for 4 hours at 140° C. and 16 hours at 200° C. After mould-release, specimens of 15×10×3 mm dimensions are cut out and utilized for determining the weight loss at 180° C.

To evaluate heat aging, pure resin samples are stored for 56 days at 180° C., and the weight loss is measured at the end of this time.

Result:
The weight loss is 1.86%.

(B) Measurement of pot life

Filled formulations are used for this purpose. The resin components are weighed as described under (A) and heated to 100° C. The filler preheated to 100° C. is then added. The reaction accelerator is added only at this stage. Further processing takes place in accordance with the method given under (A). The measurements for determining the pot life are carried out by the Höppler falling-ball measurement method at 80° C.

The results are reproduced in Table 2.

TABLE 2

| Time [minutes] | 0 | 5 | 10 | 20 | 30 | 34 |
|---|---|---|---|---|---|---|
| Viscosity [mPa.s] | 15,000 | 15,500 | 16,000 | 18,000 | 18,500 | 19,000 |

The results from Table 2 clearly show that the viscosity of the reactive resin systems, to which the reaction accelerator according to the invention has been added, builds up slowly, as is very desirable with a view to a long pot life.

What is claimed is:

1. A thermosetting reactive system comprising
   (a) at least one epoxide resin,
   (b) at least one isocyanate resin, and
   (c) a reaction accelerator of formula I

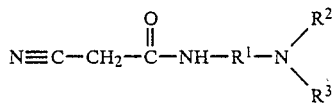

in which
R$^1$ is -(CR$^4$R$^5$)$_n$- where n is 2-24, and R$^4$ and R$^5$ independently of one another are hydrogen or C$_1$-C$_8$-alkyl,
or R$^1$ is phenylene, naphthylene or said phenylene or said naphthylene mono- or poly-substituted by halogen, by nitro, by C$_1$-C$_4$-alkyl, by C$_1$-C$_4$-alkoxy or by C$_3$-C$_8$-dialkylaminoalkyl,
or R$^1$ is a radical of the formula

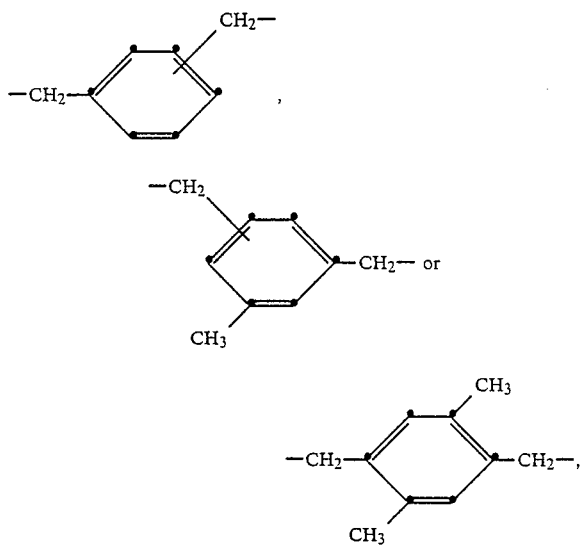

and R$^2$ and R$^3$ independently of one another are C$_1$-C$_{12}$-alkyl, C$_7$-C$_{13}$-aralkyl, phenyl, naphthyl or said phenyl or said naphthyl mono- or poly-substituted by halogen, by nitro, by C$_1$-C$_4$-alkyl or by C$_1$-C$_4$-alkoxy,
or R$_2$ and R$_3$, together with the N-atom to which they are linked, are pyrrolidino, morpholino, piperazino, 4-methylpiperazino, piperidino or perhydroazepinyl.

2. A reactive system according to claim 1, wherein the epoxide resin is a polyepoxide compound.

3. A reactive system according to claim 2, wherein the polyepoxide compound is an aliphatic, cycloaliphatic or aromatic or mixture thereof.

4. A reactive system according to claim 2, wherein the polyepoxide compound is a novolak epoxide resin or a polyoxyalkylene glycol polyglycidyl ether or mixture thereof.

5. A reactive system according to claim 1, wherein the isocyanate resin is a polyisocyanate compound.

6. A reactive system according to claim 5, wherein the polyisocyanate compound is an aliphatic, cycloaliphatic or aromatic isocyanate or mixture thereof.

7. A reactive system according to claim 5, wherein the polyisocyanate compound is an isomer mixture of 4,4'- and 2,4'-diphenylmethane diisocyanate, polyol-modified polyisocyanate or a mixture of liquid polyisocyanates with high-molecular polyisiocyanates or carbodiimide-polyisocyanates.

8. A reactive system according to claim 1, wherein $R^1$ in the compound of the formula I is $-(CH_2)_n-$ and n is a number from 2 to 20.

9. A reactive system according to claim 8, wherein n is a number from 3 to 6.

10. A reactive system according to claim 1, wherein $R^2$ and $R^3$ in the compounds of the formula I independently of one another are $C_1-C_5$alkyl.

11. A reactive system according to claim 10, wherein $R^2$ and $R^3$ in the compounds of the formula I independently of one another are methyl or ethyl.

12. A reactive system according to claim 10, wherein $R^1$ in the compounds of the formula I is ethylene or propylene, and $R^2$ and $R^3$ are identical and are ethyl, propyl or butyl.

13. A reactive system according to claim 1, wherein the reaction accelerator of the formula I is added to the reactive system in a quantity of 0.01-5.0% by weight, relative to component (a) plus component (b).

14. A process for hardening a reactive resin mixture of a polyepoxide and a polyisocyanate which comprises
incorporating therein an effective hardening amount of an accelerator of formula I according to claim 1.

15. A reactive system according to claim 1 which additionally contains a filler or other conventional additive or mixture thereof.

16. A reactive system according to claim 15 which contains conventional additives selected from the group consisting of dyes, pigments, stabilizers, adhesion promotors and mixtures thereof.

17. A reactive system according to claim 15, wherein the filler is of the mineral or fibrous type or mixture thereof.

18. A reactive system according to claim 17, wherein powdered silica, fused silica, alumina or dolomite is used as the filler.

* * * * *